(12) United States Patent
Li (10) Patent No.: US 11,443,605 B2
(45) Date of Patent: Sep. 13, 2022

(54) MONITORING APPARATUS, VEHICLE, MONITORING METHOD AND INFORMATION PROCESSING APPARATUS

(71) Applicant: BOE TECHNOLOGY GROUP CO., LTD., Beijing (CN)

(72) Inventor: Tao Li, Beijing (CN)

(73) Assignee: BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 407 days.

(21) Appl. No.: 16/489,578

(22) PCT Filed: Mar. 21, 2019

(86) PCT No.: PCT/CN2019/079082
§ 371 (c)(1),
(2) Date: Aug. 28, 2019

(87) PCT Pub. No.: WO2019/196625
PCT Pub. Date: Oct. 17, 2019

(65) Prior Publication Data
US 2021/0358283 A1 Nov. 18, 2021

(30) Foreign Application Priority Data
Apr. 12, 2018 (CN) .......................... 201810327107.5

(51) Int. Cl.
G08B 21/02 (2006.01)
B60R 22/48 (2006.01)
G06V 20/59 (2022.01)

(52) U.S. Cl.
CPC .............. *G08B 21/02* (2013.01); *B60R 22/48* (2013.01); *G06V 20/593* (2022.01); *B60R 2022/4816* (2013.01); *B60R 2022/4866* (2013.01)

(58) Field of Classification Search
CPC ............ B60R 22/48; B60R 2022/4866; B60R 2022/4875; B60R 21/0153; B60R 21/01538; G08B 21/02; G06K 9/00838
See application file for complete search history.

(56) References Cited

U.S. PATENT DOCUMENTS

| 4,849,733 | A | * | 7/1989 | Conigliaro | .............. | B60R 22/48 340/457.1 |
| 6,215,395 | B1 | * | 4/2001 | Slaughter | ................ | B60R 22/48 340/457 |

(Continued)

FOREIGN PATENT DOCUMENTS

| CN | 101770687 | 7/2010 |
| CN | 102254435 B | 1/2013 |

(Continued)

OTHER PUBLICATIONS

Chinese Office Action dated Feb. 27, 2020.

*Primary Examiner* — Andrew W Bee
(74) *Attorney, Agent, or Firm* — Dilworth & Barrese, LLP.; Michael J. Musella, Esq.

(57) ABSTRACT

A monitoring apparatus, a vehicle, a monitoring method and an information processing apparatus. The monitoring apparatus is used for a vehicle and includes an image acquisition device, a processor and an alarm device. The image acquisition device is configured to acquire image information inside the vehicle. The processor, connected to the image acquisition device and the alarm device, is configured to control the alarm device to perform an alarm in a case where the image information meets preset violation conditions. The monitoring apparatus acquires the image information inside the vehicle through the image acquisition device, and after analysis and comparison by the processor, in a case where the image information meets the preset violation conditions is determined, the monitoring apparatus controls (Continued)

the alarm device to perform an alarm, which is conductive to discovering potential dangers of driving and improving the driving safety.

10 Claims, 5 Drawing Sheets

(56) References Cited

U.S. PATENT DOCUMENTS

| | | | |
|---|---|---|---|
| 10,235,889 B2 | 3/2019 | Wei | |
| 10,252,696 B2 * | 4/2019 | Doshi | G08B 21/02 |
| 2002/0113876 A1 * | 8/2002 | Kim | B60R 25/1004 |
| | | | 348/148 |
| 2003/0160689 A1 * | 8/2003 | Yazdgerdi | B60N 2/2812 |
| | | | 340/457.1 |
| 2014/0358376 A1 * | 12/2014 | Phelan | B60W 40/08 |
| | | | 701/41 |
| 2017/0088041 A1 * | 3/2017 | Johnson | B60Q 1/50 |
| 2017/0124831 A1 | 5/2017 | Li | |
| 2018/0211543 A1 * | 7/2018 | Wei | G06Q 10/0833 |
| 2018/0222441 A1 * | 8/2018 | Koase | B60R 22/48 |

FOREIGN PATENT DOCUMENTS

| | | |
|---|---|---|
| CN | 103359038 | 10/2013 |
| CN | 103568838 A | 2/2014 |
| CN | 203651707 U | 6/2014 |
| CN | 204020712 U | 12/2014 |
| CN | 105005811 A | 10/2015 |
| CN | 105243838 A | 1/2016 |
| CN | 204946059 U | 1/2016 |
| CN | 105329204 A | 2/2016 |
| CN | 205365407 | 7/2016 |
| CN | 105966307 A | 9/2016 |
| CN | 106295601 A | 1/2017 |
| CN | 106494349 A | 3/2017 |
| CN | 108398841 A | 8/2018 |
| CN | 108528340 A | 9/2018 |
| JP | 2002079910 A | 3/2002 |
| JP | 2004-161087 A | 6/2004 |

\* cited by examiner

MONITORING APPARATUS, VEHICLE, MONITORING METHOD AND INFORMATION PROCESSING APPARATUS

The present application is based on PCT/CN2019/079082, filed on Mar. 21, 2019, which claims priority of the Chinese Patent Application No. 201810327107.5, filed on Apr. 12, 2018, the entire disclosure of which is incorporated herein by reference as part of the present application.

TECHNICAL FIELD

Embodiments of the present disclosure relates to a monitoring apparatus, a vehicle, a monitoring method and an information processing apparatus.

BACKGROUND

With the continuous improvement of people's living standards, travelling by car has become a choice for many people, and driving safety has become a more noteworthy issue. At present, a safety system installed inside a vehicle determines whether a user wears a safety belt mainly by detecting whether a safety belt plug is inserted into a fixed base. This detection method is not accurate enough and cannot detect more potential driving hazards, which is not conducive to monitoring and managing the driving safety of the vehicle.

SUMMARY

At least one embodiment of the present disclosure provides a monitoring apparatus for a vehicle, which includes an image acquisition device, a processor and an alarm device. The image acquisition device is configured to acquire image information inside the vehicle; and the processor, connected to the image acquisition device and the alarm device, is configured to control the alarm device to perform an alarm in a case where the image information meets preset violation conditions.

For example, in the monitoring apparatus provided by one embodiment of the present disclosure, the preset violation conditions include that a passenger does not wear a seat belt, and a child sits in a copilot seat.

For example, in the monitoring apparatus provided by one embodiment of the present disclosure, the alarm device includes a sounding component connected to the processor. The preset violation conditions include a first preset violation condition, and the processor is configured to control the sounding component to perform a sound alarm prompt in a case where the image information meets the first preset violation condition.

For example, in the monitoring apparatus provided by one embodiment of the present disclosure, the first preset violation condition includes that a passenger not wearing a seat belt is detected for a first time and a child being in a copilot seat is detected for a first time.

For example, in the monitoring apparatus provided by one embodiment of the present disclosure, the alarm device includes a communication component connected to the processor. The preset violation conditions include a second preset violation condition, and the processor is configured to control the communication component to send alarm information to a preset terminal in a case where the image information meets the second preset violation condition.

For example, in the monitoring apparatus provided by one embodiment of the present disclosure, the second preset violation condition includes: a passenger not wearing a seat belt is detected within a continuous predetermined time, and a child being in a copilot seat or a child driving a vehicle is detected within the continuous predetermined time.

For example, the monitoring apparatus provided by one embodiment of the present disclosure further includes a positioning device. The positioning device, connected to the processor, is configured to position the vehicle and generate location information of the vehicle, and the processor is further configured to control the communication component to send the location information of the vehicle to the preset terminal in the case where the image information meets the second preset violation condition.

For example, the monitoring apparatus provided by one embodiment of the present disclosure further includes a detection device. The detection device, connected to the processor, is configured to detect operation information of the vehicle, and the processor is further configured to control the communication component to send the operation information of the vehicle to the preset terminal in a case where the image information meets the preset violation conditions.

For example, the monitoring apparatus provided by one embodiment of the present disclosure further includes a positioning device and a detection device. The positioning device, connected to the processor, is configured to position the vehicle and generate location information of the vehicle. The detection device, connected to the processor, is configured to detect operation information of the vehicle, and the operation information of the vehicle includes a driving direction of the vehicle, and the processor is further configured to send alarm information to the preset terminal located on a driving road and in the driving direction of the vehicle according to the operation information of the vehicle and the location information of the vehicle.

For example, in the monitoring apparatus provided by one embodiment of the present disclosure, the operation information of the vehicle further includes start-up information of the vehicle, and the processor is further configured to control the image acquisition device to be turned on or off according to the start-up information.

For example, in the monitoring apparatus provided by one embodiment of the present disclosure, the detection device includes a direction sensor, an acceleration sensor and a nine-axis sensor.

For example, in the monitoring apparatus provided by one embodiment of the present disclosure, the monitoring apparatus is a vehicle inspection label for the vehicle. The vehicle inspection label includes a first surface and a second surface which are opposite to each other, and the second surface of the vehicle inspection label is provided with a display screen. The display screen is configured to display vehicle inspection information of the vehicle.

For example, in the monitoring apparatus provided by one embodiment of the present disclosure, the image acquisition device is provided on a first surface of the vehicle inspection label.

For example, in the monitoring apparatus provided by one embodiment of the present disclosure, in a case where the alarm device includes a communication component, the display screen is connected to the communication component, and the display screen is further configured to display updated vehicle inspection information of the vehicle received through the communication component.

For example, the monitoring apparatus provided by one embodiment of the present disclosure further includes a power management device. The power management device is connected to the processor, and the processor is configured to control the power management device to switch on or off power according to the operation information of the vehicle detected by the detection device.

For example, the monitoring apparatus provided by one embodiment of the present disclosure further includes an on/off key. The on/off key, connected to the image acquisition device, is configured to control the image acquisition device to be turned on or off.

For example, the monitoring apparatus provided by one embodiment of the present disclosure further includes a volume control key. In a case where the alarm device includes a sounding component, the volume control key connected to the sounding component is configured to control a sounding volume of the sounding component.

At least one embodiment of the present disclosure further provides a vehicle, which includes any monitoring apparatus provides by embodiments of the present disclosure.

At least one embodiment of the present disclosure further provides a monitoring method for a vehicle, which includes acquiring image information inside the vehicle; determining whether the image information meets preset violation conditions; and performing an alarm in a case where a determined result is yes.

For example, in the monitoring method provided by one embodiment of the present disclosure, determining whether the image information meets the preset violation conditions; and performing an alarm in the case where the determined result is yes, includes: determining whether the image information meets a first preset violation condition; prompting in a case where the image information meets the first preset violation condition; and/or, determining whether the image information meets a second preset violation condition; sending alarm information to a preset terminal, in a case where the image information meets the second preset violation condition.

For example, in the monitoring method provided by one embodiment of the present disclosure, prompting in the case where the image information meets the first preset violation condition, includes performing a sound alarm prompt.

For example, in the monitoring method provided by one embodiment of the present disclosure, sending the alarm information to the preset terminal in the case where the image information meets the second preset violation condition, includes: positioning the vehicle to acquire location information of the vehicle in the case where the image information meets the second preset violation condition; and sending the location information of the vehicle to the preset terminal.

For example, in the monitoring method provided by one embodiment of the present disclosure, in the case where the image information meets the second preset violation condition, the monitoring method further includes: detecting operation information of the vehicle, and the operation information of the vehicle comprising a driving direction of the vehicle; and sending the alarm information to the preset terminal located on a driving road and in the driving direction of the vehicle according to the location information of the vehicle and the operation information of the vehicle.

For example, in the monitoring method provided by one embodiment of the present disclosure, the monitoring method, before acquiring the image information inside the vehicle, further includes: detecting start-up information of the vehicle; and acquiring the image information inside the vehicle in a case where the start-up information is that the vehicle is started.

At least one embodiment of the present disclosure further provides an information processing apparatus for monitoring a vehicle. The information processing apparatus is configured to: receive image information inside the vehicle from a terminal, compare the image information with preset violation conditions, and send a comparison result to the terminal.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative to the disclosure.

DETAILED DESCRIPTION

In order to make objects, technical solutions and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by those of ordinary skill in the art to which the present disclosure belongs. The terms "first," "second," etc., which are used in the description and the claims of the present disclosure, are not intended to indicate any sequence, amount or importance, but used to distinguish various components. Also, the terms such as "a," "an," "the," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

As shown in FIGS. 1 to 4, some embodiments of the present disclosure provide a monitoring apparatus 1 for a vehicle, which includes an image acquisition device 10, a processor 20, and an alarm device 30. The image acquisition device 10 is configured to acquire image information inside the vehicle; and the processor 20, connected to the image acquisition device 10 and the alarm device 30, is configured to control the alarm device 30 to perform an alarm in a case where the image information meets preset violation conditions.

The monitoring apparatus 1 includes an image acquisition device 10, a processor 20, and an alarm device 30. The image acquisition device 10 may adopt a camera or any other device or means that may acquire image information inside a vehicle. The image acquisition device 10 is configured to acquire the image information inside the vehicle. For example, the image information inside the vehicle includes a driver driving image, a passenger image at a copilot position, or an image at any other position. For example, the image acquisition device 10 such as a camera is preferably installed, so that all images of the upper body part of personnel inside the vehicle can be captured.

For example, the processor 20 is connected to the image acquisition device 10 and the alarm device 30. After acquiring the image information inside the vehicle, the processor 20 analyzes the image information. For example, the image information may be compared with preset violation conditions stored previously in the processor. For example, the preset violation conditions may include a variety of conditions, including, for example, a passenger not wearing a seat belt, a child sitting in a copilot seat, etc.

Determining whether the personnel inside the vehicle wears a seat belt is taken as an example, for example, the processor 20 may learn previously characteristic information such as color, shape, width or the like of the seat belt, so as to determine whether the image information contains the characteristic information of the seat belt. For example, if the processor 20 determines that the image information does not contain the characteristic information of the safety belt, the processor 20 considers that the image information meets the preset violation conditions, and sends an alarm command to the alarm device 30 to cause the alarm device 30 to operate to perform an alarm.

The vehicle monitoring apparatus provided by the embodiment of the present disclosure may be used for a vehicle. The image information inside the vehicle is acquired with the image acquisition apparatus. After analysis and comparison performed by the processor, in a case where the image information is determined to meet the preset violation conditions, the alarm device is controlled to give an alarm, which is conductive to discovering potential safety hazards of driving and improving driving safety degree.

Figure 1:
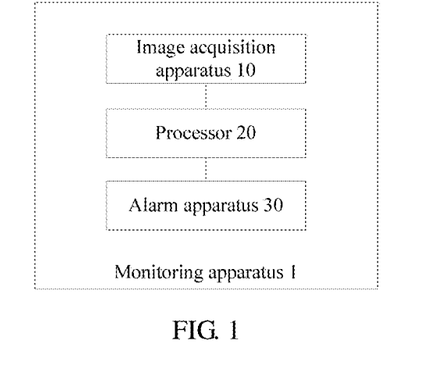
FIG. 1 is a schematic structural diagram of a monitoring apparatus provided by some embodiments of the present disclosure.
Figure 2:
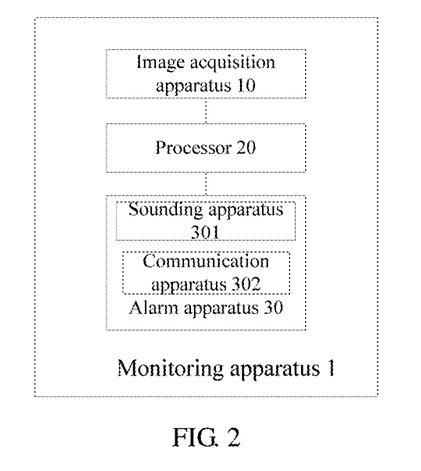
FIG. 2 is a schematic structural diagram of another monitoring apparatus provided by some embodiments of the present disclosure.

For example, in the monitoring device 1 provided in some embodiments of the present disclosure, as shown in FIG. 2, the alarm device 30 includes a sounding component 301, which is connected to the processor 20. The preset violation conditions include a first preset violation condition, and the processor 20 is used to control the sounding component 301 to perform a sound alarm prompt in a case where the image information meets the first preset violation condition. For example, the sounding component 301 may be a speaker.

For example, the first preset violation condition may include that a passenger not wearing a seat belt is detected for a first time. At that time, it may be the case that the passenger has not yet had time to fasten the seat belt just after the vehicle is started, or forgets to fasten the seat belt. After a sound prompt is made by the sounding component 301, the passenger can avoid dangers if he corrects immediately. For example, the first preset violation condition may further include that a child being in a copilot seat is detected for a first time. In a case where a child being in a copilot seat is detected for the first time, a sound prompt may be made by the sounding component 301, thereby avoiding potential dangers.

For example, in the monitoring apparatus 1 provided by some embodiments of the present disclosure, as shown in FIG. 2, the alarm device 30 further includes a communication component 302 connected to the processor 20. The preset violation conditions include a second preset violation condition, and the processor 20 is used to control the communication component 302 to send alarm information to a preset terminal in a case where the image information meets the second preset violation condition. For example, the communication component 302 may be a wireless communication component, including but not limited to communicating in wireless communication modes such as a mobile communication network, wifi, Bluetooth, ZigBee, etc.

The preset violation conditions include a first preset violation condition and/or a second preset violation condition. In a case where the image information meets the first preset violation condition, the processor 20 controls the sounding component 301 in the alarm device 30 to perform a sound alarm prompt. In a case where the image information meets the second preset violation condition, the processor 20 controls the communication component 302 in the alarm device 30 to send alarm information to the preset terminal. For example, violation situations of the first preset violation condition may be slighter relative to those of the second preset violation condition. For example, the first preset violation condition may include that a passenger not wearing a seat belt is detected for a first time. At that time, it may be that the passenger has not yet had time to fasten the seat belt just after the vehicle is started, or forgets to fasten the seat belt. After a sound prompt is performed by the sounding component 301, the passenger may correct immediately, thereby avoiding potential dangers. Correspondingly, the second preset violation condition may include that the image information collected within a continuous predetermined time (e.g., five minutes) does not include the characteristic information of the safety belt, i.e., indicating that the passenger has not worn the safety belt all the time. At that time, there is a situation that the passenger still does not correct after being prompted by the sound. Then, the violation conditions are more serious, and it is likely to cause an accident. At that time, the processor 20 sends alarm information to a preset terminal by means of the communication component 302. For example, the preset terminal may be a device such as a server of a traffic police brigade or a handheld terminal of a traffic police, etc.

Of course, the first preset violation condition and the second preset violation condition may also include other situations. For example, the first preset violation condition includes that a child being in a copilot seat is detected for a first time, and accordingly, the second preset violation condition includes a child being in a copilot seat is detected within a continuous predetermined time (e.g., five minutes). The second preset violation condition may also include a child driving a vehicle, etc. The monitoring apparatus provided by the embodiment of the present disclosure may report violation (illegal) behaviors in the driving process of the vehicle, thereby urging drivers or passengers inside the vehicle to correct violation driving behaviors and improving driving safety.

Figure 3:
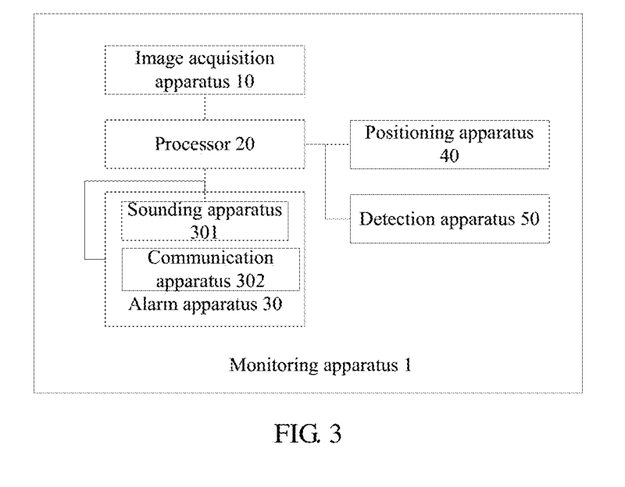
FIG. 3 is a schematic structural diagram of still another monitoring apparatus provided by some embodiments of the present disclosure.

For example, as shown in FIG. 3, the monitoring apparatus 1 provided by some embodiments of the present disclosure further includes a positioning device 40 which is connected to the processor 20 and configured to position a vehicle and generating location information of the vehicle. The processor 20 is further configured to control the communication component 302 to send the location information of the vehicle to the preset terminal in a case where the image information meets the second preset violation condition. For example, the positioning device 40 may adopt a GPS or Beidou positioning system.

For example, in the case where the image information meets the second preset violation condition, the positioning device 40 positions the vehicle and generates location information of the vehicle. And the processor 20 controls the communication component 302 to send the location information of the vehicle to a preset terminal, so that a holder of the preset terminal can timely and accurately determine the location of the violation vehicle, thereby urging the driver or passenger inside the vehicle to correct the violation behavior and improving the driving safety.

For example, as shown in FIG. 3, the monitoring apparatus 1 provided by some embodiments of the present disclosure further includes a detection device 50, which is connected to the processor 20 and is configured to detect operation information of the vehicle. The processor 20 is further configured to control the communication component 302 to send the operation information of the vehicle to the preset terminal in a case where the image information meets the second preset violation condition. For example, the operation information of the vehicle includes a driving direction of the vehicle, and the processor 20 is further configured to send alarm information to a preset terminal located on a driving road and in the driving direction of the vehicle according to the operation information of the vehicle and the location information of the vehicle.

For example, in the case where the image information meets the second preset violation condition, the detection device 50 may also detect the driving direction of the vehicle, and select a preset terminal that is closer to the vehicle or in the driving direction of the vehicle according to the location information of the vehicle and the driving direction of the vehicle, so that the holder of the preset terminal can timely and accurately intercept and manage the vehicle, thereby correcting and punishing the violation behavior of the driver of the vehicle, and thus improving the driving safety.

For example, the operation information of the vehicle also includes start-up information of the vehicle, and the processor 20 is further configured to control the image acquisition device 10 to be turned on or off according to the start-up information of the vehicle detected by the detection device 50.

For example, the operation information of the vehicle detected by the detection device 50 also includes the start-up information of the vehicle. For example, in a case where the start-up of the vehicle is detected, the processor 20 controls the image acquisition device 10 to start operate to collect the image information inside the vehicle, so as to avoid driving dangers due to the personnel inside the vehicle not turning on the monitoring apparatus.

For example, the vehicle may be provided with one or more detection devices 50. For example, the detection devices 50 may include a sensor (e.g., a direction sensor) that detects a driving direction of a vehicle and a sensor (e.g., an acceleration sensor) that detects a start-up situation of the vehicle, or a sensor (e.g., a nine-axis sensor) that simultaneously detects the driving direction of the vehicle and the start-up situation of the vehicle.

Figure 4:
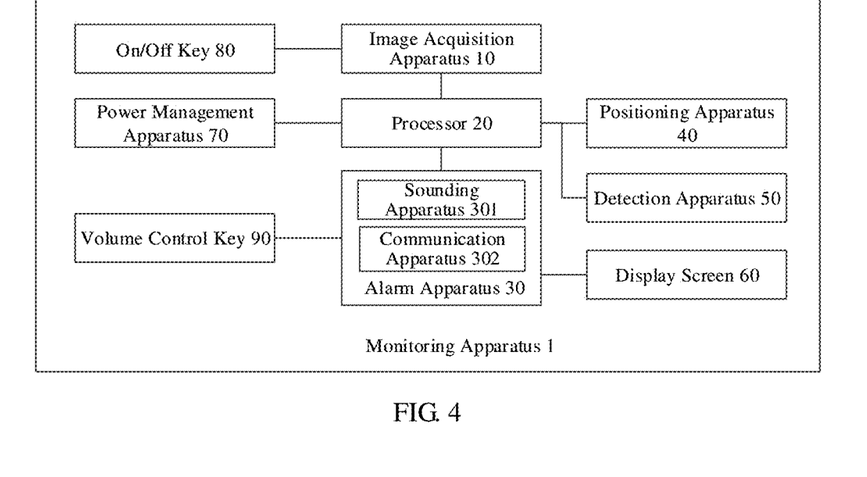
FIG. 4 is a schematic structural diagram of still another monitoring apparatus provided by some embodiments of the present disclosure.
Figure 5:
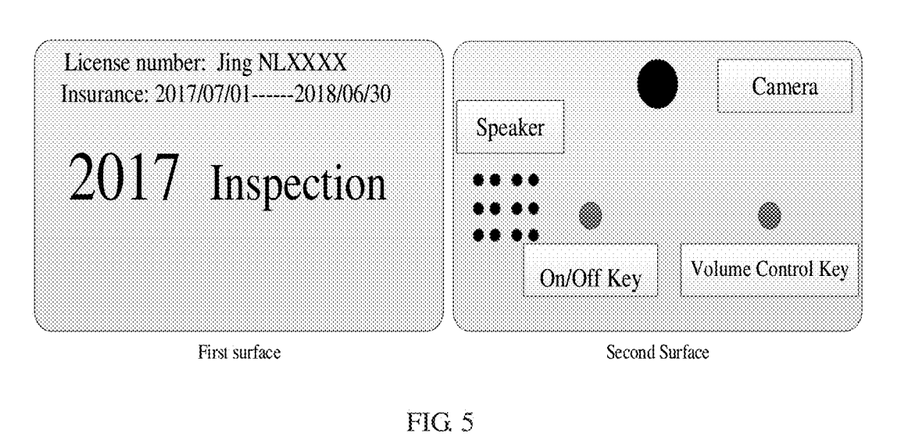
FIG. 5 is a schematic diagram of the monitoring apparatus provided by the embodiment of the present disclosure implemented as a vehicle inspection label.

For example, as shown in FIGS. 4 and 5, the monitoring apparatus 1 may be a vehicle inspection label for a vehicle, and the vehicle inspection label includes a first surface and a second surface opposite to each other. The image acquisition device 10 (e.g., a camera) is provided on the first surface of the vehicle inspection label, and the second surface of the vehicle inspection label is provided with a display screen 60 for displaying vehicle inspection information of the vehicle.

For example, in the monitoring apparatus 1 provided by some embodiments of the present disclosure, the display screen 60 is connected to the communication component 302, and the display screen 60 is further used to display updated vehicle inspection information of the vehicle received by the communication component 302.

In the embodiment of the present disclosure, the monitoring apparatus 1 can be integrated with a vehicle inspection label, which comprises a first surface and a second surface opposite to each other. The first surface is facing the interior of the vehicle, and is provided with an image acquisition device (e.g., a camera). The second side is facing the exterior of the vehicle with a display screen, and the vehicle inspection information of the vehicle is displayed on the display screen. For example, after the communication component receives the updated vehicle inspection information, the vehicle inspection information displayed on the display screen can also be updated to facilitate the traffic police to view. In addition, the vehicle inspection information may be updated remotely by the communication component, without re-pasting paper vehicle inspection label, and the use is more convenient.

In the embodiment of the present disclosure, the processor may be implemented by a general-purpose integrated circuit chip or an application-specific integrated circuit chip. For example, an integrated circuit chip may be provided on a motherboard, and for example, the motherboard may also be provided with a memory, a power supply circuit, etc. In addition, the processor may also be implemented by a circuit or by software, hardware (circuit), firmware, or any combination thereof. In embodiments of the present disclosure, the processor may include various computing structures, such as a complex instruction set computer (CISC) structure, a reduced instruction set computer (RISC) structure, or a structure that implements a combination of multiple instruction sets. In some embodiments, the processor may also be a microprocessor, such as an X86 processor or an ARM processor, or may be a digital processor (DSP) or the like.

For example, in the embodiment of the present disclosure, a storage medium may also be provided on the motherboard described above, and instructions and/or data executed by the processor may be stored on the storage medium. For example, preset violation conditions (including a first preset violation condition and a second preset violation condition) may be stored on the storage medium. For example, characteristic information (color, shape, width, etc.) of a safety belt may be stored. And for example, the storage medium may also be stored with a pre-recorded warning sound, and the processor may directly invoke it from the storage medium when needed.

For example, the storage medium may include one or more computer program products, which may include various forms of computer readable memory, such as volatile memory and/or nonvolatile memory. The volatile memory may include, for example, random access memory (RAM) and/or cache, etc. The non-volatile memory may include, for example, read only memory (ROM), magnetic disks, optical disks, semiconductor memory (e.g., flash memory, etc.), and the like. One or more computer program instructions may be stored on the computer readable memory, and the processor may execute the program instructions to implement desired functions (implemented by the processor) in embodiments of the present disclosure.

For example, as shown in FIGS. 4 and 5, the monitoring apparatus 1 provided by some embodiments of the present disclosure further includes: a power management device 70 connected to the processor 20 which is configured to control the power management device 70 to turn on or off power according to operation information (such as start-up information) of the vehicle detected by the detection device 50; an on/off key 80 connected to the image acquisition device 10, which is used to control the image acquisition device 10 to turn on or off; a volume control key 90, configured to be connected to a sounding component 301 and control a sounding volume of the sounding component 301 in a case where the alarm device 30 includes the sounding component 301.

For example, in a case where the detection device 50 detects that the vehicle is started, the processor 20 can control the power management device 70 to turn on power, so that the monitoring apparatus 1 is powered on to start operating, thereby avoiding driving dangers caused by the personnel in the vehicle not turning on the monitoring apparatus 1. The on/off key 80 is configured to control the image acquisition device 10 to be turned on or off. For example, when parking, the on/off key 80 may be manually triggered to turn off the image acquisition device 10. The volume control key 90 may be used to adjust the volume of the sounding component 301.

In addition, it should be noted that as long as the detection device 50 detects that the vehicle is in a driving state (e.g., the vehicle maintains a certain speed), the power management device 70 will automatically turn on the power so as to start the image acquisition device 10, thereby preventing the personnel inside the vehicle from attempting to turn off the image acquisition device 10 to avoid being monitored.

It should be noted that in the monitoring apparatus 1 provided in the embodiment of the present disclosure, in a case where the monitoring apparatus 1 includes the communication component 302, respective encoding/decoding device need to be provided correspondingly. Similarly, in a case where the monitoring apparatus 1 includes the display screen 60, respective driving circuits also need to be provided correspondingly. Conventional designs may be adopted in this regard, which will not be repeated herein.

Figure 6:
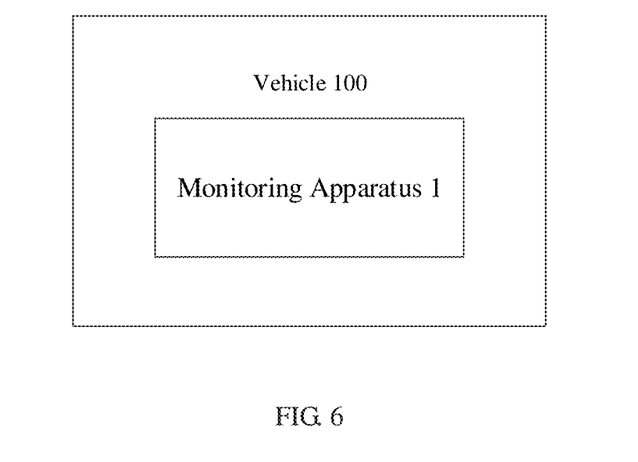
FIG. 6 is a schematic diagram of a vehicle provided by some embodiments of the present disclosure.

Some embodiments of the present disclosure also provide a vehicle 100. As shown in FIG. 6, the vehicle 100 includes a monitoring apparatus 1. For example, the monitoring apparatus 1 may adopt any of the monitoring apparatus 1 provided by the above embodiments of the present disclosure. For example, the monitoring apparatus 1 may be provided on a glass in front of the co-pilot of the vehicle. For example, the image acquisition device 10 of the monitoring apparatus 1 may face the interior of the vehicle, and may at least acquire the upper half body image of the driver or the passenger at the copilot position during operation, so that a warning or alarm may be given for violation behaviors, thereby improving driving safety.

It should be noted that the structure and working principle of the monitoring apparatus 1 in the vehicle 100 can be referred to the corresponding description in the above embodiments and will not be repeated here.

Figure 7:
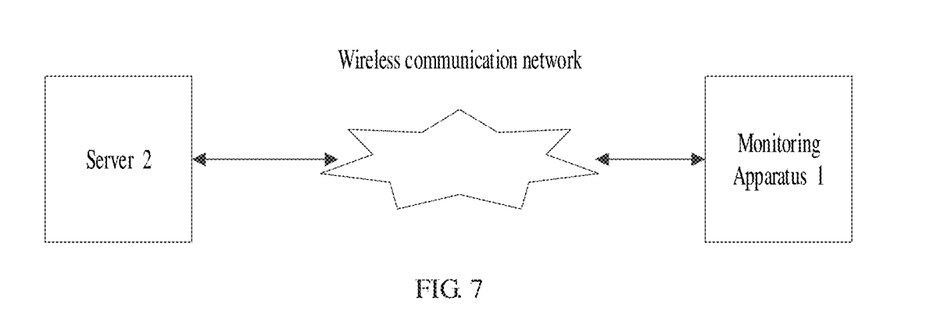
FIG. 7 is a schematic diagram of communication between a monitoring apparatus and a server provided by some embodiments of the present disclosure.

For example, as shown in FIG. 7, in a case where a monitoring apparatus 1 is provided in a vehicle, the monitoring apparatus 1 may communicate with a server through a wireless communication network. For example, the server may be a server of a vehicle management unit, and for example, the server may include a database regarding vehicle information. For example, after a certain vehicle completes a vehicle inspection, an administrator of the server may upload the updated vehicle inspection information of the vehicle to the server so as to update the database included in the server, and then the server may send the updated vehicle inspection information to the monitoring apparatus 1 on the corresponding vehicle via the wireless communication network. For example, the monitoring apparatus 1 may control the display screen to display the vehicle inspection information after receiving the updated vehicle inspection information, thus realizing remote update of the vehicle inspection information. In this way, the cost and time for pasting paper vehicle inspection labels on vehicles can be saved.

In addition, in a case where the monitoring apparatus 1 monitors that a driver or passenger inside the vehicle has violation behaviors, the location information or other alarm information of the vehicle may also be sent to the server through the wireless communication network, and then the server sends these information to a preset terminal. For example, the preset terminal may be a device such as a hand-held terminal of a traffic police or the like. For example, the above wireless communication network includes, but is not limited to, a mobile communication network (3G/4G/5G), a wifi network, a Bluetooth network, a ZigBee network, an Internet of Things network, and the like.

It should be noted that the monitoring apparatus 1 provided by the embodiment of the present disclosure may not include the processor 20, and the judgement processing on the image information may be performed in the server 2. At that time, the monitoring apparatus 1 only needs to send the acquired image information inside the vehicle to the server 2, and the server 2 determines whether the image information meets the preset violation conditions.

Some embodiments of the present disclosure also provide an information processing apparatus for monitoring a vehicle, which is configured to receive image information inside the vehicle from a terminal, compare the image information with preset violation conditions, and send a comparison result to the terminal. For example, the information processing apparatus may be the server 2 in FIG. 7, and the terminal may be the monitoring apparatus 1 provided in the vehicle. The server 2 receives the image information inside the vehicle from the monitoring apparatus 1, compares the image information with preset violation conditions, and then sends the comparison result to the monitoring apparatus 1. For example, the monitoring apparatus 1 may give a sound alarm or generate alarm information to other terminals according to the comparison result.

Figure 8:
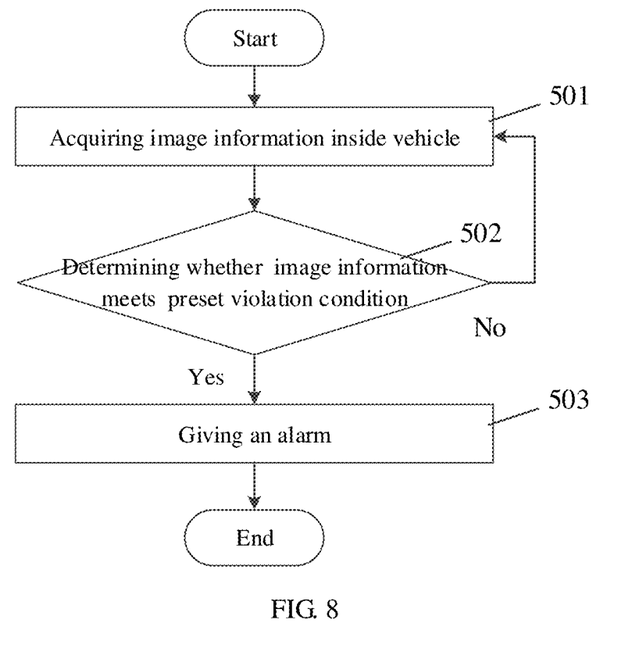
FIG. 8 is a flow diagram of a monitoring method provided by some embodiments of the present disclosure.

Some embodiments of the present disclosure also provide a monitoring method, as shown in FIG. 8. This method may be used for a vehicle and include the following operations:

Step 501, acquiring image information inside the vehicle;

Step 502, determining whether the image information meets preset violation conditions, and Step 503, performing an alarm, in a case where the determined result is yes.

In step 501, the image information inside the vehicle is acquired. For example, the image information includes a driver driving image, a passenger image at a co-pilot position, or an image at any other position. For example, the image information inside the vehicle may be acquired by an image acquisition device such as a camera. For example, the image acquisition device is preferably installed so that all images of the upper body part of personnel inside the vehicle can be captured. After the image information inside the vehicle is acquired, the processor analyzes the image information. For example, the image information may be compared with the preset violation conditions stored previously in the processor. For example, the preset violation conditions may include a variety of conditions, including, for example, a passenger not wearing a seat belt, a child sitting in a copilot seat, etc.

Determining whether the personnel inside the vehicle wears a seat belt is taken as an example, for example, before used, the processor may learn previously characteristic information such as color, shape, width or the like of the seat belt, so as to determine whether the image information contains the characteristic information of the seat belt. If the image information does not contain the characteristic information of the safety belt, the processor considers that the image information meets the preset violation conditions, and sends an alarm instruction to an alarm device to cause the alarm device to operate to give an alarm.

The vehicle control method provided by the embodiment of the present disclosure may be applied to a vehicle. By acquiring image information inside the vehicle, through analyzing and comparing the image information, in a case where the image information meeting the preset violation conditions is determined, an alarm is given, which is conductive to finding hidden dangers of driving safety and improving driving safety.

Figure 9:
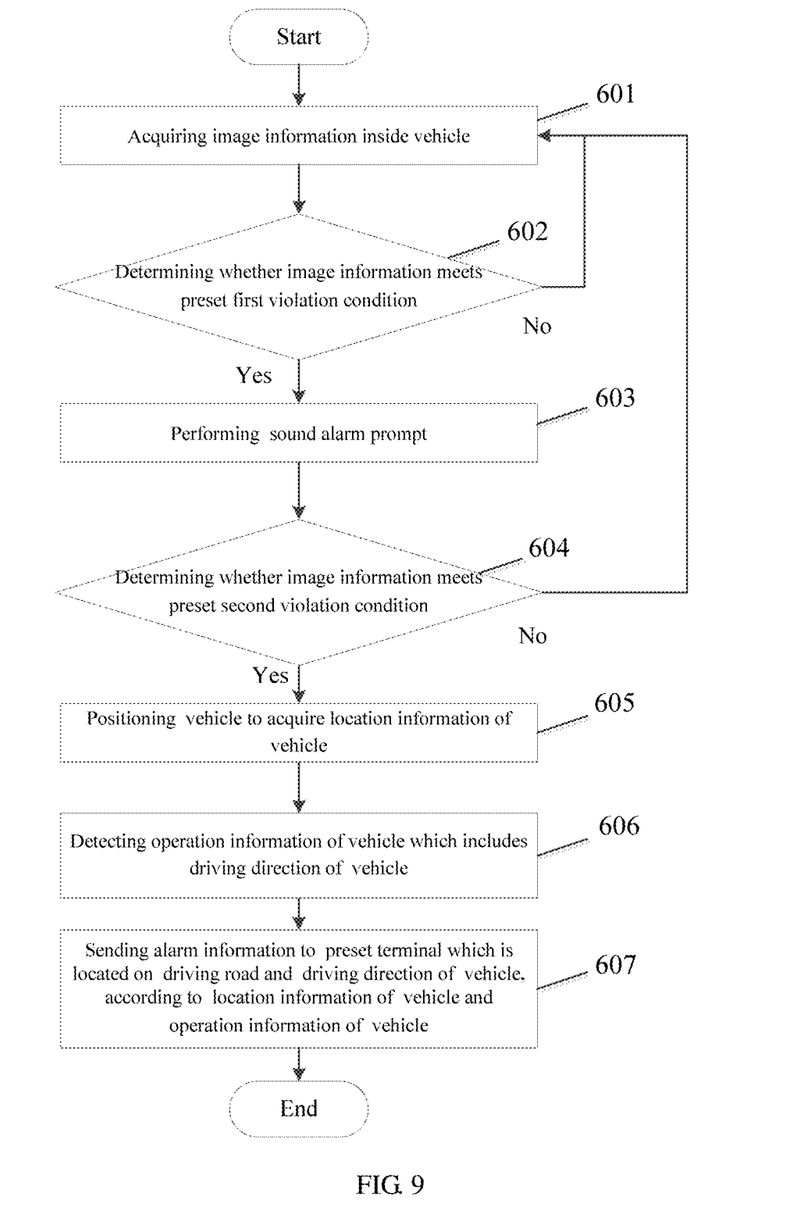
FIG. 9 is a flow diagram of another monitoring method provided by some embodiments of the present disclosure.

For example, as shown in FIG. 9, some embodiments of the present disclosure also provide a vehicle control method, which includes the following operations.

Step 601, acquiring image information inside the vehicle;

Step 602, determining whether the image information meets first preset violation conditions;

Step 603, performing a sound alarm prompt in a case where the image information meets the first preset violation condition; and/or, Step 604: determining whether the image information meets a second preset violation condition;

Step 605, positioning the vehicle to acquire location information of the vehicle in a case where the image information meets the second preset violation condition;

Step 606, detecting operation information of the vehicle, and the operation information of the vehicle including a driving direction of the vehicle;

Step 607, sending alarm information to a preset terminal which is located on the driving road and in the driving direction of the vehicle, according to the location information of the vehicle and the operation information of the vehicle.

The preset violation conditions may include the first preset violation condition and/or the second preset violation condition. In a case where the image information meets the first preset violation condition, a processor controls a sounding component in an alarm device to perform a sound alarm prompt. In a case where the image information meets the second preset violation condition, the processor controls a communication component in the alarm device to send alarm information to the preset terminal. For example, violation situations of the first preset violation condition may be slighter relative to that of the second preset violation condition. For example, the first preset violation condition may include that a passenger not wearing a seat belt is detected for a first time. At that time, it may be that the passenger has not yet had time to fasten the seat belt just after the vehicle is started, or forgets to fasten the seat belt. After a sound prompt is performed by the sounding component, the passenger may correct immediately, thereby avoiding dangers. Correspondingly, the second preset violation condition may include that the image information collected within a continuous predetermined time (e.g., five minutes) does not include the characteristic information of the safety belt, i.e., indicating that the passenger has not worn the safety belt all the time, and at that time there is a situation that the passenger still does not make a correction after being prompted by the sound. At that time, this violation situation is more serious, and it is likely to cause a safety accident. At that time, the processor sends alarm information to the preset terminal by means of the communication component. For example, the preset terminal may be a device such as a server of a traffic police brigade or a handheld terminal of a traffic police, etc.

Of course, the first preset violation condition and the second preset violation condition may also include other situations. For example, the first preset violation condition includes that a child being in a copilot seat is detected for a first time, and accordingly, the second preset violation condition includes a child being in a copilot seat is detected within a continuous predetermined time (e.g., five minutes). The second preset violation condition may also include a child driving a vehicle, etc. The monitoring method provided by the embodiment of the present disclosure may report violation (illegal) behaviors in the driving process of the vehicle, thereby urging drivers or passengers inside the vehicle to correct violation driving behaviors and improving driving safety.

In addition, in a case where the image information meets the second preset violation condition, the positioning device may be used to position the vehicle to generate location information of the vehicle, the location information of the vehicle may be sent to a preset terminal by the communication component, so that a holder of the preset terminal can timely and accurately determine the location of the violation vehicle, thereby urging the drivers or passengers inside the vehicle to correct the violation behaviors and improving the driving safety.

In addition, in a case where the image information meets the second preset violation condition, the detection device may be used to detect the driving direction of the vehicle, and a preset terminal close to the vehicle or in the driving direction of the vehicle may be selected according to the location information of the vehicle and the driving direction of the vehicle, so that the holder of the preset terminal can timely and accurately intercept and manage the vehicle, thereby correcting and punishing the violation behavior of the driver of the vehicle, thus improving the driving safety.

For example, in the monitoring method provided by some embodiments of the present disclosure, before acquiring the image information inside the vehicle, the monitoring method further includes: detecting start-up information of the vehicle; and acquiring the image information inside the vehicle in a case where the start-up information is that the vehicle is started.

From the above description of the embodiments, those skilled in the art may clearly understand that the present disclosure may be implemented by means of software and necessary general-purpose hardware. Of course, also by means of hardware, but in many cases the former is the preferred embodiment. Based on this understanding, the technical solution of the present disclosure (in essence or for a contribution part to the prior art) may be embodied in the form of a software product. The computer software product is stored in a readable storage medium, such as a floppy disk, hard disk or optical disk of a computer, and includes several instructions to cause a computer device (which may be a personal computer, a server, or a network device, etc.) to perform the methods described in various embodiments of the present disclosure.

The above description is only a specific embodiment of the present disclosure, but the scope of the present disclosure is not limited to this. Any person familiar with the technical field can easily think of changes or substitutions within the technical scope of the present disclosure, which should be covered within the scope of the present disclosure. Therefore, the scope of the present disclosure should be defined by the accompanying claims.

What is claimed is:

1. A monitoring apparatus for a vehicle, comprising an image acquisition device, a processor and an alarm device;
   wherein the image acquisition device is configured to acquire image information inside the vehicle;
   wherein the processor, connected to the image acquisition device and the alarm device, is configured to control the alarm device to perform an alarm in a case where the image information meets preset violation conditions;
   wherein the preset violation conditions comprise a first preset violation condition and a second preset violation condition, violation situations of the first preset violation condition is slighter relative to that of the second preset violation condition;
   wherein the alarm device comprises a communication component connected to the processor, and the processor is configured to control the communication component to send alarm information to a preset terminal in a case where the image information meets the second preset violation condition; and
   wherein the second preset violation condition comprises that a passenger not wearing a seat belt is detected within a continuous predetermined time, and a child being in a copilot seat or a child driving a vehicle is detected within the continuous predetermined time.

2. The monitoring apparatus according to claim 1, further comprising a positioning device,
   wherein the positioning device, connected to the processor, is configured to position the vehicle and generate location information of the vehicle; and
   wherein the processor is further configured to control the communication component to send the location information of the vehicle to the preset terminal in the case where the image information meets the second preset violation condition.

3. The monitoring apparatus according to claim 1, further comprising a detection device,
   wherein the detection device, connected to the processor, is configured to detect operation information of the vehicle; and
   wherein the processor is further configured to control the communication component to send the operation information of the vehicle to the preset terminal in a case where the image information meets the preset violation conditions.

4. The monitoring apparatus according to claim 3, wherein the detection device comprises a direction sensor, an acceleration sensor and a nine-axis sensor.

5. The monitoring apparatus according to claim 3, further comprising a power management device,
   wherein the power management apparatus is connected to the processor, and the processor is configured to control the power management device to switch on or off power according to the operation information of the vehicle detected by the detection device.

6. The monitoring apparatus according to claim 1, further comprising a positioning device and a detection device,
   wherein the positioning device, connected to the processor, is configured to position the vehicle and generate location information of the vehicle;
   the detection device, connected to the processor, is configured to detect operation information of the vehicle; and
   the operation information of the vehicle comprises a driving direction of the vehicle, and the processor is further configured to send alarm information to a preset terminal located on a driving road and in the driving direction of the vehicle according to the operation information of the vehicle and the location information of the vehicle.

7. The monitoring apparatus according to claim 6, wherein the operation information of the vehicle further comprises start-up information of the vehicle, and the processor is further configured to control the image acquisition device to be turned on or off according to the start-up information.

8. A monitoring apparatus for a vehicle, comprising an image acquisition device, a processor and an alarm device;
   wherein the image acquisition device is configured to acquire image information inside the vehicle;
   wherein the processor, connected to the image acquisition device and the alarm device, is configured to control the alarm device to perform an alarm in a case where the image information meets preset violation conditions;
   wherein the preset violation conditions comprise a first preset violation condition and a second preset violation condition, violation situations of the first preset violation condition is slighter relative to that of the second preset violation condition;
   wherein the alarm device comprises a communication component connected to the processor, and the processor is configured to control the communication component to send alarm information to a preset terminal in a case where the image information meets the second preset violation condition; and
   wherein the monitoring apparatus is a vehicle inspection label for the vehicle; the vehicle inspection label comprises a first surface and a second surface opposite to each other, and the second surface of the vehicle inspection label is provided with a display screen, and the display screen is configured to display vehicle inspection information of the vehicle, and wherein the image acquisition device is provided on a first surface of the vehicle inspection label.

9. The monitoring apparatus according to claim 8, wherein the display screen is connected to the communication component, and the display screen is further configured to display updated vehicle inspection information of the vehicle received through the communication component.

10. A monitoring method for a vehicle, comprising:

acquiring image information inside the vehicle;

determining whether the image information meets a preset violation condition; and performing an alarm in a case where a determined result is yes, wherein the preset violation conditions comprise a first preset violation condition and a second preset violation condition, violation situations of the first preset violation condition is slighter relative to that of the second preset violation condition;

wherein the determining whether the image information meets the preset violation conditions; and the performing an alarm in the case where the determined result is yes, comprises:

determining whether the image information meets the first preset violation condition;

prompting in a case where the image information meets the first preset violation condition;

and, determining whether the image information meets the second preset violation condition;

sending alarm information to a preset terminal, in a case where the image information meets the second preset violation condition; and wherein sending the alarm information to the preset terminal in the case where the image information meets the second preset violation condition, comprises:

positioning the vehicle to acquire location information of the vehicle in the case where the image information meets the second preset violation condition; and sending the location information of the vehicle to the preset terminal, or, the monitoring method further comprises:

detecting operation information of the vehicle, and the operation information of the vehicle comprising a driving direction of the vehicle; and sending the alarm information to the preset terminal located on a driving road and in the driving direction of the vehicle according to the location information of the vehicle and the operation information of the vehicle.

\* \* \* \* \*